United States Patent
Ma et al.

(10) Patent No.: US 7,175,694 B2
(45) Date of Patent: Feb. 13, 2007

(54) COMPOSITE GAS SEPARATION MODULES HAVING INTERMEDIATE POROUS METAL LAYERS

(75) Inventors: Yi Hua Ma, Worcester, MA (US); Ivan P. Mardilovich, Worcester, MA (US); Erik E. Engwall, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 117 days.

(21) Appl. No.: 10/804,846

(22) Filed: Mar. 19, 2004

(65) Prior Publication Data

US 2004/0237779 A1    Dec. 2, 2004

Related U.S. Application Data

(60) Provisional application No. 60/457,061, filed on Mar. 21, 2003.

(51) Int. Cl.
*B01D 53/22* (2006.01)
*B01D 71/02* (2006.01)
*B01D 65/10* (2006.01)

(52) U.S. Cl. .............................. 95/56; 96/77; 427/405

(58) Field of Classification Search .................... 95/55, 95/56; 96/4, 11; 55/524, 487, DIG. 5; 427/250, 427/405; 428/548
See application file for complete search history.

(56) References Cited

U.S. PATENT DOCUMENTS 2,958,391 A    11/1960   deRosset
3,241,298 A    3/1966    Pierce
3,413,777 A    12/1968   Langley et al.
3,428,476 A    2/1969    Langley et al.
4,496,373 A *  1/1985    Behr et al. ................. 205/354
4,589,891 A    5/1986    Iniotakis et al.

(Continued)

FOREIGN PATENT DOCUMENTS

DE         101 35 390 A      2/2003

(Continued)

OTHER PUBLICATIONS

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

(Continued)

*Primary Examiner*—Frank M. Lawrence
(74) *Attorney, Agent, or Firm*—Hamilton, Brook, Smith & Reynolds, PC

(57) ABSTRACT

The present invention relates to a composite gas separation module and to methods for fabricating a composite gas separation module. The present invention also relates to methods for selectively separating hydrogen gas from a hydrogen gas-containing gaseous stream. In one embodiment, the composite gas separation module includes a porous metal substrate; an intermediate porous metal layer, wherein the intermediate porous metal layer overlies the porous metal substrate; and a dense hydrogen-selective membrane, wherein the dense hydrogen-selective membrane overlies the intermediate porous metal layer. The intermediate porous metal layer can include palladium and a Group IB metal. For example, the intermediate porous metal layer can contain alternating layers of palladium and a Group IB metal.

48 Claims, 1 Drawing Sheet

U.S. PATENT DOCUMENTS

| | | | |
|---|---|---|---|
| 4,699,637 A * | 10/1987 | Iniotakis et al. | 96/10 |
| 4,857,080 A * | 8/1989 | Baker et al. | 95/56 |
| 5,049,167 A | 9/1991 | Castro et al. | |
| 5,139,541 A | 8/1992 | Edlund | |
| 5,205,841 A | 4/1993 | Vaiman | |
| 5,215,729 A | 6/1993 | Buxbaum | |
| 5,217,506 A | 6/1993 | Edlund et al. | |
| 5,258,339 A | 11/1993 | Ma et al. | |
| 5,259,870 A | 11/1993 | Edlund | |
| 5,358,553 A | 10/1994 | Najjar et al. | |
| 5,393,325 A | 2/1995 | Edlund | |
| 5,449,848 A | 9/1995 | Itoh | |
| 5,451,386 A | 9/1995 | Collins et al. | |
| 5,498,278 A | 3/1996 | Edlund | |
| 5,614,001 A | 3/1997 | Kosaka et al. | |
| 5,652,020 A | 7/1997 | Collins et al. | |
| 5,672,388 A | 9/1997 | McHenry et al. | |
| 5,738,708 A | 4/1998 | Peachey et al. | |
| 5,782,959 A | 7/1998 | Yang et al. | |
| 5,782,960 A | 7/1998 | Ogawa et al. | |
| 5,904,754 A | 5/1999 | Juda et al. | |
| 6,152,987 A | 11/2000 | Ma et al. | |
| 6,152,995 A | 11/2000 | Edlund | |
| 6,183,542 B1 | 6/2001 | Bossard | |
| 6,267,801 B1 | 7/2001 | Baake et al. | |
| 6,309,546 B1 | 10/2001 | Herrmann et al. | |
| 6,379,524 B1 | 4/2002 | Lee et al. | |
| 6,372,363 B1 | 6/2002 | Krueger | |
| 6,419,728 B1 | 6/2002 | Edlund | |
| 6,475,268 B2 | 11/2002 | Thornton | |
| 6,547,858 B1 | 4/2003 | Edlund et al. | |
| 6,596,057 B2 | 7/2003 | Edlund et al. | |
| 6,730,145 B1 | 5/2004 | Li | |
| 6,916,454 B2 | 7/2005 | Alvin | |
| 6,964,697 B2 | 11/2005 | Pan et al. | |
| 7,018,446 B2 | 3/2006 | Alvin et al. | |
| 2002/0020298 A1 | 2/2002 | Ernst et al. | |
| 2002/0083829 A1 | 7/2002 | Edlund et al. | |
| 2002/0164496 A1 | 11/2002 | Mahmood et al. | |
| 2003/0183080 A1* | 10/2003 | Mundschau | 95/55 |
| 2003/0190486 A1 | 10/2003 | Roa et al. | |
| 2003/0213365 A1 | 11/2003 | Jantsch et al. | |
| 2003/0222015 A1* | 12/2003 | Oyama et al. | 210/500.21 |
| 2004/0037962 A1 | 2/2004 | Uemura et al. | |
| 2004/0244589 A1 | 12/2004 | Bossard et al. | |
| 2005/0072304 A1* | 4/2005 | Etievant et al. | 96/11 |
| 2006/0188737 A1 | 8/2006 | Roa et al. | |

FOREIGN PATENT DOCUMENTS

| | | |
|---|---|---|
| EP | 1277512 A | 1/2003 |
| FR | 2820 988 A | 8/2002 |
| JP | 5085702 | 4/1993 |
| JP | 05-123548 | 5/1993 |
| JP | 10-028850 A | 2/1998 |
| WO | WO 99/33545 | 7/1999 |
| WO | WO 02/066144 | 8/2002 |
| WO | WO 03/011433 A1 | 2/2003 |
| WO | WO 2005/075060 A1 | 8/2005 |

OTHER PUBLICATIONS

Gryaznov, V. M., et al., "Preparation and catalysis over Palladium Composite Membranes," *Applied Catalysis A: General*, 96:15-23 (1993).

Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).

Ma, Y. H., et al., "Thin Composite Palladium and Palladium/Alloy Membranes for Hydrogen Separation," *Ann. N.Y. Acad. Sci.*, 984:346 (2003).

Mardilovich, I. P., et al., "Dependence of Hydrogen Flux on The Pore Size and Plating Surface Topology of Asymmetric Pd-Porous Stainless Steel Membranes," *Desalination*, 144:85-89 (2002).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Roa, F., "Preparation and Characterization of Pd-Cu Composite Membranes for Hydrogen Separation," *Chem. Eng. J.*, 93:11 (2003).

Roa, F., et al., "The Influence of Alloy Composition on The $H_2$ Flux of Composite Pd-Cu Membranes," *Desalination*, 147:411-416 (2002).

Shu, J., et al., "Structurally Stable Pd-Ag Alloy Membranes: Introduction of a Diffusion Barrier," *Thin Solid Films*, 286:72-79 (1996).

U.S. Appl. No. 60/475,620, filed Jun. 4, 2003, Peter R. Bossard.

U.S. Appl. No. 10/804,847, Yi Hua Ma, Ivan P. Mardilovich and Erik E. Engwall, filed Mar. 19, 2004.

U.S. Appl. No. 10/804,848, Yi Hua Ma, Ivan P. Mardilovich and Erik E. Engwall, filed Mar. 19, 2004.

U.S. Appl. No. 10/836,088, Yi Hua Ma, Ivan P. Mardilovich and Erik E. Engwall, filed Apr. 30, 2004.

* cited by examiner

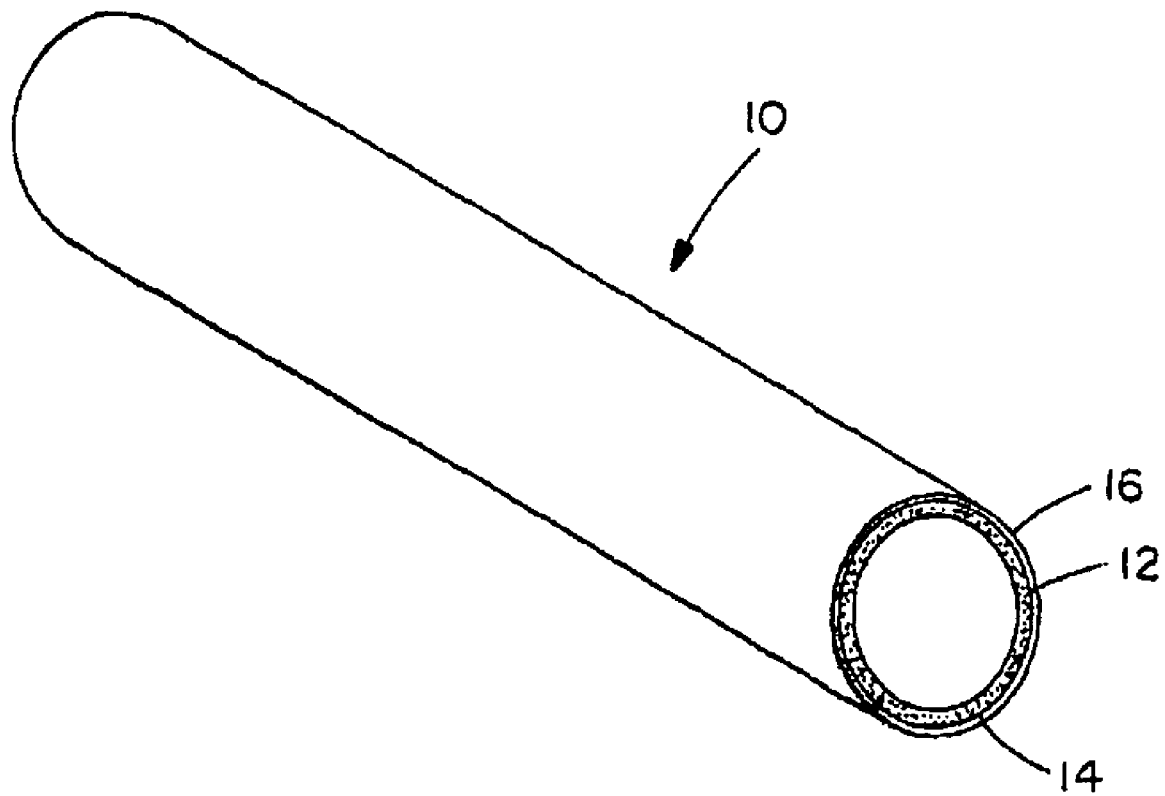

COMPOSITE GAS SEPARATION MODULES HAVING INTERMEDIATE POROUS METAL LAYERS

RELATED APPLICATION

This application claims the benefit of U.S. Provisional Application No. 60/457,061, filed on Mar. 21, 2003. The entire teachings of the above application are incorporated herein by reference.

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

The effective life of a typical composite gas separation module having a hydrogen-selective metal membrane bonded to a porous substrate often is limited by diffusion of substrate components into the membrane which decreases the hydrogen permeability of the membrane. The rate of diffusion of the substrate components is greatest when the substrate is at or above its Tamman temperature. A metal lattice at its Tamman temperature is subjected to considerable thermal (atomic) vibration. If there is an interface between two metals, such thermal vibration significantly increases the mobility of metal atoms and their consequent diffusion. The Tamman temperature of a material is equal to one-half of its melting point temperature in Kelvin. For example, in the case of a hydrogen-selective palladium membrane on a stainless steel substrate, palladium and stainless steel have melting point temperatures of 1552° C. (1825 K) and 1375–1400° C. (1648–1673 K), respectively. The corresponding Tamman temperatures are about 640° C. (913 K) and 550–560° C. (823–833 K), respectively. The lower of these Tamman temperatures determines the temperature where a significant increase in intermetallic diffusion can occur. Accordingly, at temperatures around 550° C. considerable thermal vibration and diffusion of stainless steel substrate components into a palladium membrane can be expected in such a composite gas separation module. The alloy created by the diffusion of stainless steel substrate components into a palladium membrane can have reduced hydrogen permeability.

One solution to this problem has been to use a ceramic substrate, which tends to exhibit less diffusion of substrate components into the hydrogen-selective metal membrane than a predominantly metallic substrate. However, ceramic substrates are typically more brittle than predominantly metallic substrates. Further, ceramic substrates can be more difficult to fabricate and also can be more difficult to join to other components in a gas separation system.

Gas separation modules formed purely of a hydrogen-selective metal such as palladium also have been used. Eliminating the presence of the substrate in such a gas separation module can remove the problem of intermetallic diffusion. However, such a module can be very expensive to produce and can lack the mechanical strength that can be required for high pressure and/or high temperature applications. For example, a gas separation module formed purely of a hydrogen-selective metal generally must have a much greater thickness than a composite gas separation module to provide adequate mechanical strength. This increase in thickness can reduce the gas flux that can be established through the module.

Therefore, a need exists for composite gas separation modules (and methods for their fabrication) that overcome or minimize the above-referenced problems.

SUMMARY OF THE INVENTION

The present invention relates to a composite gas separation module and to methods for fabricating a composite gas separation module. The present invention also relates to methods for selectively separating hydrogen gas from a hydrogen gas-containing gaseous stream.

In one embodiment, the composite gas separation module includes a porous metal substrate; an intermediate porous metal layer, wherein the intermediate porous metal layer overlies the porous metal substrate; and a dense hydrogen-selective membrane, wherein the dense hydrogen-selective membrane overlies the intermediate porous metal layer.

A method for fabricating a composite gas separation module includes applying an intermediate porous metal layer over a porous metal substrate and applying a dense hydrogen-selective membrane over the intermediate porous metal layer, thereby forming the composite gas-separation module. The present invention also relates to a composite gas separation module formed by this method.

The intermediate porous metal layer can include palladium, e.g., the intermediate porous metal layer can include palladium and a Group IB metal. The intermediate porous metal layer can contain alternating layers of palladium and a Group IB metal. In one aspect of the present invention, the intermediate porous metal layer can include at least one metal that enhances the gas permeability of the dense gas-selective membrane upon intermetallic diffusion of the metal into the membrane. In some embodiments, the dense hydrogen-selective membrane includes palladium or an alloy thereof.

In one embodiment of the invention, a method for selectively separating hydrogen gas from a hydrogen gas-containing gaseous stream includes the step of directing the hydrogen gas-containing gaseous stream to a composite gas separation module, wherein the composite gas separation module includes a porous metal substrate; an intermediate porous metal layer, wherein the intermediate porous metal layer overlies the porous metal substrate; and a dense hydrogen-selective membrane, wherein the dense hydrogen-selective membrane overlies the intermediate porous metal layer. By this method, hydrogen gas is at least partially partitioned from the gaseous stream by passing through the dense hydrogen-selective membrane.

The performance of composite gas separation modules can be limited by the thickness of the constituent dense hydrogen-selective membrane; the number and size of defects (e.g., pores, holes, cracks or other physical conditions that impair the gas-selectivity of the composite gas separation module by allowing the passage of an undesired gas) in the membrane; and the composition of the membrane. To obtain efficient separation, a dense hydrogen-selective membrane should not be breached by regions or points which do not produce the desired gas selectivity by allowing the passage of an undesired gas. In general, at high temperatures, rates of intermetallic diffusion of metal atoms between adjacent structures of the composite gas separation module can become significant. For example, at high temperatures metal atoms of the porous metal substrate can diffuse at a significant rate into the dense hydrogen-selective membrane. A dense hydrogen-selective membrane into which substrate components have diffused can produce reduced flux of a desired gas through the membrane. For example, the diffusion of components from a porous metal substrate into a palladium or palladium alloy dense hydrogen-selective membrane can cause deterioration of hydrogen permeation flux through the membrane.

Practice of the present invention can protect against diffusion of substrate components into the dense hydrogen-selective membrane. By preventing or reducing the diffusion of substrate components into the dense hydrogen-selective membrane, the gas permeation flux through the composite gas separation module can be maintained throughout operation of the composite gas-separation module in a gas separation process. In addition, the methods described herein for preventing or reducing the diffusion of substrate components into the dense hydrogen-selective membrane are economical and relatively simple to perform.

The intermediate porous metal layer of the present invention can also improve adhesion of the dense hydrogen-selective membrane to the porous support. For example, during a gas separation operation, the composite gas separation modules described herein can avoid membrane blistering, delamination and/or cracking even when operating at high temperatures and/or for extended periods of time.

In one embodiment, the intermediate porous metal layer has a smaller pore size than the porous metal substrate. Since the effective pore size of the support is made smaller, less hydrogen-selective metal can be used to form a dense hydrogen-selective membrane. Thus, a composite gas separation module having a dense hydrogen-selective membrane thinner than dense hydrogen-selective membranes of conventionally produced composite gas separation modules can be fabricated. Forming a thinner dense hydrogen-selective membrane can also simplify manufacturing by reducing the number of layers of hydrogen-selective metal that must be applied to the porous substrate to form a dense hydrogen-selective membrane. Therefore, practice of the present invention can reduce manufacturing costs, e.g., material, labor and capital costs, for fabricating composite gas separation modules as compared to conventional fabrication techniques.

Since thinner dense hydrogen-selective membranes typically produce higher rates of gas flux, composite gas separation modules fabricated as described herein can produce higher rates of gas flux, e.g., hydrogen flux. Thus, gas separation processes utilizing the composite gas separation modules described herein can achieve higher rates of gas separation than is possible using conventional composite gas separation modules employing thicker dense hydrogen-selective membranes.

BRIEF DESCRIPTION OF THE DRAWINGS

The FIGURE is a sectional perspective view of a composite gas separation module as one embodiment of the present invention.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

The present invention relates to a composite gas separation module, comprising: (a) a porous metal substrate; (b) an intermediate porous metal layer, wherein the intermediate porous metal layer overlies the porous metal substrate; and (c) a dense hydrogen-selective membrane, wherein the dense hydrogen-selective membrane overlies the intermediate porous metal layer. In one embodiment, the intermediate porous metal layer includes palladium and a Group IB metal. For example, the intermediate porous metal layer can include alternating layers of palladium and a Group IB metal. The composite gas separation modules described herein can prevent or reduce the diffusion of components of the porous metal substrate into the dense hydrogen-selective membrane.

The composite gas separation modules described herein include a dense gas-selective membrane such as, for example, a dense hydrogen-selective membrane. The dense hydrogen-selective membrane can include, for example, palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective membrane that is substantially free of defects such as open pores, holes, cracks and other physical conditions that impair the gas-selectivity of the composite gas separation module by allowing the passage of an undesired gas. In some embodiments, a dense gas-separation membrane can contain one or more non-metallic components, however, the dense gas-separation membranes described herein contain at least one metallic component (e.g., a hydrogen-selective metal such as palladium or an alloy thereof).

The term "support," as used herein, includes a substrate, a surface treated substrate, a substrate upon which a material (e.g., a gas-selective material) has been deposited, a substrate with an overlying intermediate porous metal layer, or a subsequently plated substrate upon which a dense gas-selective membrane has been or will be formed. Serving as a support structure, the substrate can enhance the durability and strength of the composite gas separation module.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

In one embodiment, the gas-selective material can include a combination of substances, for example, a combination of a hydrogen-selective metal and a zeolite. In one embodiment, the zeolite used in a combination of substances is gas-selective. In an alternative embodiment, the zeolite used in a combination of substances is not gas-selective, for example, the zeolite used in a combination of substances is not hydrogen-selective.

Specific embodiments of the invention, including the composite gas separation modules, methods for fabricating the composite gas separation modules, and the method for selectively separating hydrogen gas from a hydrogen gas-containing gaseous stream follow. Details of optional components of the composite gas separation modules and method steps employed in various embodiments of methods for fabrication of the composite gas separation modules, are described thereafter under separate subheadings.

The FIGURE illustrates cylindrical composite gas separation module 10 as one embodiment of the invention. Composite gas separation module 10 includes porous substrate 12, intermediate porous metal layer 14, and dense gas-selective membrane 16. As illustrated, intermediate porous metal layer 14 and dense gas-selective membrane 16 overlie the outside surface of cylindrical porous substrate 12. In alternative embodiments not illustrated, intermediate porous metal layer 14 and dense gas-selective membrane 16 can overlie the interior surface of cylindrical porous substrate 12 (with the dense gas-selective membrane forming the innermost of the three cylindrical layers) or can overlie both the interior and the exterior surfaces of porous substrate 12. In a preferred embodiment, intermediate porous metal layer 14 and dense gas-selective membrane 16 overlie only either the interior or the exterior surface of porous substrate 12. The composite gas separation module can take any of a variety of forms including a cylindrical tube, as illustrated in the FIGURE, or a planar surface. In one embodiment, porous metal substrate 12 also includes a layer of ceramic bonded thereto.

The composite gas separation module of the invention includes a porous metal substrate. The porous metal substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTELLOY® alloys (e.g., HASTELLOY® C-22) (trademarks of Haynes International, Inc., Kokomo, Ind.) and INCONEL® alloys (e.g., INCONEL® alloy 625) (INCONEL is a trademark of Huntington Alloys Corp., Huntington W. Va.). In one embodiment, the porous metal substrate is an alloy containing chromium and nickel. In an additional embodiment, the alloy contains chromium, nickel and molybdenum such as, for example, HASTELLOY® C-22® or INCONEL® alloy 625. The porous metal substrate can be porous stainless steel. Cylinders of porous stainless steel that are suitable for use as substrates are available from Mott Metallurgical Corporation (Farmington, Conn.) and from Pall Corporation (East Hills, N.Y.), for example.

One of ordinary skill in the art can select substrate thickness, porosity, and pore size distribution using techniques known in the art. Desired substrate thickness, porosity and pore size distribution can be selected based on, among other factors, the operating conditions of the final composite gas separation module such as operating pressure. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. In some embodiments, the mean or median pore size of the substrate can be about 0.1 to about 15 microns, e.g., from about 0.1 to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

The composite gas separation module also includes an intermediate porous metal layer, wherein the intermediate porous metal layer overlies the porous metal substrate. In one embodiment, for example, the intermediate porous metal layer has a top side and a bottom side and the intermediate porous metal layer is directly adjacent to the porous metal substrate on the bottom side and is directly adjacent to the dense hydrogen-selective membrane on the top side.

The intermediate porous metal layer can include palladium. For example, the intermediate porous metal layer can include palladium and a Group IB metal, e.g., palladium and copper or palladium and silver. In one embodiment, the intermediate porous metal layer includes alternating layers of palladium and the Group IB metal. For example, the composite gas separation module can include an intermediate porous metal layer having alternating layers of palladium and silver in conjunction with a palladium or a palladium/silver alloy dense hydrogen-selective membrane, or the composite gas separation module can include an intermediate porous metal layer having alternating layers of palladium and copper in conjunction with a palladium or a palladium/copper alloy dense hydrogen-selective membrane.

In one embodiment, the intermediate porous metal layer has been formed by a method that includes electroless plating. For example, alternating layers of palladium and a Group IB metal can be applied using electroless plating.

In one embodiment, the intermediate porous metal layer contains about three to about six layers of palladium that alternate with about 2 to about 4 layers of the Group IB metal. The thickness of the individual alternating layers can be about 0.05 to about 5 microns thick, e.g., about 0.1 to about 4 microns, about 0.2 to about 3 microns, or about 0.3 to about 1.5 microns. Examples of the order of the deposited layers include, but are not limited to, Pd—Ag—Pd—Ag—Pd and Pd—Ag—Pd—Ag—Pd—Pd—Ag—Pd—Ag—Pd.

In one embodiment, the intermediate porous metal layer is at least about 1, 2, 3, 4, or at least about 5 microns thick. For example, the intermediate porous metal layer can be about 1 to about 10, about 4 to about 8, or about 4 to about 6 microns thick. In one embodiment, the intermediate porous metal layer is not significantly less porous to helium gas flux than the porous substrate. In another embodiment, the intermediate porous metal layer is not significantly less porous to helium gas flux than the porous substrate. The intermediate porous metal layer can have a mean pore size that is less than the mean pore size of the porous metal substrate. In one embodiment, the largest pore of the intermediate porous metal layer is smaller than the largest pore of the porous metal substrate.

The intermediate porous metal layer can protect against intermetallic diffusion between the porous metal substrate and the dense gas-selective membrane. In some embodiments, intermetallic diffusion can occur between the porous metal substrate and the intermediate porous metal layer, but this diffusion does not substantially impair the performance of the dense gas-selective membrane. Without wishing to be held to any particular theory, intermetallic diffusion between the intermediate porous metal layer and the dense gas-selective membrane is not thought to be harmful to the gas selectivity of the membrane. In some embodiments, intermetallic diffusion between the intermediate porous metal layer and the dense gas-selective membrane enhances the permeability of the membrane. For example, the formation of a palladium alloy via diffusion of intermediate porous metal layer atoms into a dense hydrogen-selective membrane can enhance the hydrogen permeability of a dense hydrogen-selective membrane that includes palladium or alloy thereof. In one embodiment, the intermediate porous metal layer includes palladium and a Group IB metal, the dense gas-selective membrane includes palladium, and intermetallic diffusion of either or both of palladium and the Group IB metal from the intermediate porous metal layer into the dense gas-selective membrane improves the selective gas permeation through the membrane. Preferably, in one embodiment, the intermediate porous metal layer does not contain a concentration of a material which causes a substantial reduction in the performance of the dense gas-selective membrane upon diffusion of that material into the membrane.

The intermediate porous metal layer of the present invention can improve adhesion of the dense gas-selective membrane to the porous metal substrate. For example, during a gas separation operation, the composite gas separation modules described herein can avoid membrane blistering, delamination and/or cracking even when operating at high temperatures and/or for extended periods of time. Without wishing to be held to any particular theory, the improvement in adhesion is thought to result from inter-diffusion of the metal particles of the intermediate porous metal layer and/or intermetallic diffusion between the intermediate porous metal layer and the porous metal substrate on one side and the dense gas-selective membrane on the other side. For example, inter-diffusion can occur when the composite gas separation module is heated to operational temperatures (e.g., about 350° C. to about 600° C.).

The composite gas separation module can further include a substrate surface treatment underlying the intermediate porous metal layer, as described infra. For example, a layer of a ceramic can be bonded to the porous metal substrate and underlie the intermediate porous metal layer. The ceramic can include oxides, nitrides, and/or carbides, for example, iron oxide, iron nitride, iron carbide and/or aluminum oxide.

The composite gas separation module can also further comprise a layer of a metal selected from the group consisting of palladium, gold and platinum, wherein the layer of metal overlies the porous metal substrate and/or a substrate surface treatment and underlies the intermediate porous metal layer. Such deposits of metal are discussed infra.

The composite gas separation module includes a dense gas-selective membrane, wherein the dense gas-selective membrane overlies the intermediate porous metal layer. In one embodiment, the dense gas-selective membrane is selectively permeable to hydrogen, e.g., the dense gas-selective membrane is a dense hydrogen-selective membrane and can include one or more hydrogen-selective metals or alloys thereof. "Hydrogen-selective metals" include, but are not limited to, niobium (Nb), tantalum (Ta), vanadium (V), palladium (Pd), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen.

In one embodiment, the dense gas-separation membrane can include one or more non-metallic components. In another embodiment, the dense gas-separation membrane can include one or more components that are not gas-selective materials, e.g., components that are not hydrogen-selective materials.

In one embodiment, the thickness of the dense gas-selective membrane is less than about 3 times the diameter of the largest pore of the porous substrate. For example, the thickness of the dense gas-selective membrane can be less than about 2.5, 2, or less than about 1.5 times the diameter of the largest pore of the porous substrate. While the thickness of the dense gas-selective membrane can depend, among other factors, on the size of the largest pores in the porous substrate, in some embodiments the dense gas-selective membrane is less than about 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

In one aspect, performance of the composite gas separation modules described herein can be assessed by measuring hydrogen flux through the module during operation. For example, hydrogen flux through the composite gas separation modules, in one embodiment, is at least about 4 $Nm^3/m^2$-hr at about 350° C. and with a hydrogen partial pressure difference of about 1 bar.

In one aspect, the invention includes a method for fabricating a composite gas separation module, comprising the steps of: (a) applying an intermediate porous metal layer over a porous metal substrate; and (b) applying a dense hydrogen-selective membrane over the intermediate porous metal layer, thereby forming the composite gas separation module. Suitable porous metal substrates, intermediate porous metal layers and dense hydrogen-selective membranes are described supra. A description of suitable fabrication techniques follows.

In a preferred fabrication method, any contaminants are initially cleaned from the substrate, for example, by treating the substrate with an alkaline solution such as by soaking the substrate in an approximately 60° C. ultrasonic bath for about half an hour. Cleaning is typically followed by rinsing such as, for example, wherein the substrate is sequentially rinsed in tap water, deionized water and isopropanol. Preparation of the porous substrate can also include surface treatment; formation of an additional intermetallic diffusion barrier such as by oxidizing the substrate, described infra; surface activation; and/or deposition of a metal such as palladium, gold or platinum, as described infra, prior to applying the intermediate porous metal layer over the porous metal substrate.

The intermediate porous metal layer is applied over the porous metal substrate prior to application of a dense gas-selective membrane. In one embodiment, the intermediate porous metal layer is formed by depositing palladium and Group IB metal over the porous metal substrate. For example, palladium and silver can be deposited as an intermediate porous metal layer and a palladium or palladium/silver alloy dense selective membrane can be subsequently applied, or palladium and copper can be deposited as an intermediate porous metal layer and a palladium or a palladium/copper dense hydrogen-selective membrane can be subsequently applied. In one embodiment, the palladium and/or Group IB metal are deposited using electroless plating.

In one embodiment, the intermediate porous metal layer is applied by depositing alternating layers of palladium and a Group IB metal over the porous metal substrate. For example, palladium can be applied to a porous metal substrate, followed with an application of silver or copper, followed with an application of palladium, followed with an application of silver or copper, and so on. In one embodiment, palladium and a Group IB metal are electrolessly plated onto a support without rinsing, activation, drying and/or sintering of the support between sequential applications of the metals. Without wishing to be held to any particular theory, it is believed that sequential electroless deposition of layers of palladium and/or a Group IB metal without intermediate rinsing, activation, drying and/or sintering can produce particles, e.g., nano-size particles, of palladium and/or the Group IB metal.

In one embodiment, the surface of the intermediate porous metal layer is abraded, e.g., treated mechanically, thereby forming a polished substrate, prior to application of the dense gas-selective membrane over the intermediate porous metal layer. Mechanical treatment of the intermediate porous metal layer can include, for example, brushing the surface of the intermediate porous metal layer with a plastic bristle brush having a toothbrush-like consistency or gently polishing the surface with a fine emery cloth. By mechanically treating the intermediate porous metal layer, the roughness of the surface can be improved by, for example, removing relatively large particles (e.g., a Pd/Group IB metal agglomeration) from the surface of intermediate porous metal layer. In one embodiment, about 5 to about 10 weight percent of the deposited intermediate porous metal layer is removed by abrasion. Abrasion of a deposited material is further described infra.

In one embodiment, the present invention can include the step of depositing a hydrogen-selective metal on the intermediate porous metal layer, thereby forming a coated substrate and abrading the surface of the coated substrate, thereby forming a polished substrate, prior to formation of the dense gas-selective membrane (e.g., a dense hydrogen-selective membrane) over the intermediate porous metal layer.

Following application of the intermediate porous metal layer, a dense gas-selective membrane is applied over the intermediate porous metal layer. For example, a dense gas-selective membrane can be applied by depositing a gas-selective metal, e.g., a hydrogen-selective metal, over the intermediate porous metal layer. In one embodiment, palladium or an alloy thereof is deposited, e.g., electrolessly plated, over the intermediate porous metal layer, thereby forming a dense gas-selective membrane. Application of the dense gas-selective membrane can include surface activating the intermediate porous metal layer prior to depositing dense gas-selective membrane components.

Components of the dense gas-selective membrane, e.g., a hydrogen-selective metal or an alloy thereof, can be deposited over the intermediate porous metal layer using any of the techniques known in the art for depositing such materials on a support. For example, a component of the dense gas-selective membrane can be deposited on the support using electroless plating, thermal deposition, chemical vapor deposition, electroplating, spray deposition, sputter coating, e-beam evaporation, ion beam evaporation or spray pyrolysis.

An alloy of a gas-selective metal can be deposited over the intermediate porous metal layer as a component of the dense gas-selective membrane. In one embodiment, a palladium/silver alloy is formed by first depositing palladium onto the support by electroless deposition and then depositing silver, also by electroless deposition, onto the support. An alloy membrane layer can then be formed by heating the silver and palladium layers, for example, to about 500° C. to about 1000° C. in an inert or hydrogen atmosphere. In one embodiment, metal components can be co-deposited onto the support to form a layer of a finely divided mixture of small pockets of the pure metal components. In another embodiment, a technique such as sputtering or chemical vapor deposition is used to simultaneously deposit two or more metals to form an alloy layer on the support.

In one aspect the present invention includes a method for selectively separating hydrogen gas from a hydrogen gas-containing gaseous stream, by which method, hydrogen gas is at least partially partitioned from the gaseous stream by passing through a dense hydrogen-selective membrane. The method includes directing the hydrogen gas-containing gaseous stream to a composite gas separation module, wherein the composite gas separation module includes: (a) a porous metal substrate; (b) an intermediate porous metal layer, wherein the intermediate porous metal layer overlies the porous metal substrate; and (c) a dense hydrogen-selective membrane, wherein the dense hydrogen-selective membrane overlies the intermediate porous metal layer. In one embodiment, a layer of a ceramic can be bonded to the porous metal substrate and underlies the intermediate porous metal layer. The intermediate porous metal layer can be formed using any of the techniques described herein. Preferably, the dense hydrogen-selective membrane includes palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective membrane and thereby separated from the other gases.

Details of specific method steps that can be employed in various embodiments of the invention follow under separate subheadings.

Substrate Surface Treatments

The present method for forming a composite gas separation module can also include surface treating the porous metal substrate prior to application of the intermediate porous metal layer over the porous metal substrate. For example, the present method for forming a composite gas separation module can also include forming an additional intermetallic diffusion barrier on the porous substrate prior to applying the intermediate porous metal layer over the porous metal substrate. In one embodiment, forming an additional intermetallic diffusion barrier (e.g., an oxide layer intermetallic diffusion barrier) includes oxidizing the substrate in situ.

The method can include the step of forming a ceramic coating on the surface of the porous metal substrate prior to applying the intermediate porous metal layer over the porous metal substrate. In one embodiment, a metal present at the surface of the porous metal substrate is oxidized. Thus, the metal present at the substrate surface is in an oxidized state, bonded to the substrate. In another embodiment, a material is deposited on the surface of the porous metal substrate and is subsequently oxidized prior to applying the intermediate porous metal layer over the porous metal substrate. In other embodiments, a nitride layer can be formed on the surface of the porous metal substrate (prior to applying the intermediate porous metal layer over the porous metal substrate), for example, by oxidizing the substrate in an ammonia-bearing or nitrogen-based atmosphere or a carbide layer can be formed, for example, by oxidizing the porous metal substrate in an atmosphere comprising hydrocarbon gases. To enhance the stability of the composite gas separation module, particularly where it will be used at high temperatures, the substrate can be further coated with a second protective layer, such as with a layer of alumina, silica, mullite, cordierite, zirconia, titania, tantalum oxide, tungsten or magnesium oxide.

Composite gas separation modules having a surface treated substrate and methods for surface treating a substrate are described in U.S. Pat. No. 6,152,987 issued on Nov. 28, 2000, to Ma, et al., the entire contents of which is incorporated herein by reference.

Metal Deposition on the Porous Substrate

The present inventive methods for forming a composite gas separation module can also include depositing a metal selected from the group consisting of palladium, gold and platinum on the porous substrate prior to applying the intermediate porous metal layer over the porous substrate. Preferably, this deposit of metal on the porous substrate does not significantly increase the transport resistance of the substrate. In one embodiment, the thickness of this metal deposit is less than about 10, 7, 5, 3, or less than about 1 percent of the ultimate thickness of the dense gas-selective membrane.

This procedure can include surface activating the porous substrate, as described infra, prior to depositing the metal on the porous substrate. This process of depositing a metal selected from the group consisting of palladium, gold and platinum on the porous substrate can help protect the substrate from post-synthesis corrosion. In one embodiment, the deposition of palladium, gold and/or platinum on the porous substrate is made following formation of an additional intermetallic diffusion barrier such as an oxide layer intermetallic diffusion barrier, described supra.

In one embodiment, a small quantity of the metal, sufficient to cover the pore walls of the substrate, is deposited on the porous substrate without a significant reduction of the substrate porosity. Typically, the deposition of palladium, gold and/or platinum on the porous substrate is made by surface activating and plating on the side of the substrate opposite to the side on which a gas-selective membrane will be formed. For example, in one embodiment, a deposit of palladium, gold and/or platinum is formed from the inside of a substrate tube (e.g., using an electroless plating solution) and a dense gas-selective membrane is subsequently formed on the outside of the substrate tube.

Surface Activation

The present method for forming a composite gas separation module can include surface activating a support prior to deposition of a desired material (e.g., the intermediate porous metal layer, components of the dense gas-selective membrane or a metal deposited on the porous substrate). For example, a porous substrate can be surface activated prior to depositing a hydrogen-selective metal or alloy thereof on the support. In one embodiment, the surface of the intermediate porous metal layer is surface activated prior to applying a dense gas-selective membrane over the intermediate porous metal layer. In addition, applying a dense gas-selective membrane over the intermediate porous metal layer can include surface activating the support between applications of components of the dense gas-selective membrane.

In one embodiment, surface activation includes seeding the surface of the support with nuclei of a hydrogen-selective metal such as with palladium nuclei. Without wishing to be held to any particular theory, it is believed that when a surface activated support is electrolessly plated, the palladium nuclei on the surface activated substrate initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in the aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure and thickness of this layer can depend on factors such as the ratio of hydrochloride to stannous chloride; the structure, roughness and shape of the support surface; and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without surface activation of the support. However, absent surface activation, plating of the support with the metal can be slow.

Metal Deposition

Deposition of a material on a support can include plating the support with a metal (e.g., a hydrogen-selective metal). For example, depositing a metal on a support, such as depositing metal on the porous metal substrate, applying the intermediate porous metal layer and/or applying the dense gas-selective membrane can employ an electroless plating technique such as the method that follows.

In one embodiment, plating is conducted by electroless plating. For example, palladium deposition can occur according to the autocatalytic reactions of Chemical Equations I and II:

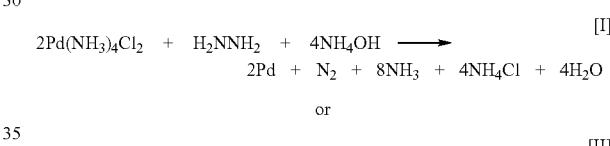

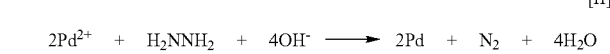

In one embodiment, a plating solution is prepared that contains the following: 4.0 g/L $Pd(NH_3)_4Cl_2H_2O$; 198 mL/L $NH_4OH$ (28%); 40.1 g/L $Na_2EDTA$; and 5.6–7.6 mL/L $H_2NNH_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 cm$^3$ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine ($H_2NNH_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

As alternatives to electroless plating, a material, e.g., palladium, can be deposited on the support by other suitable metal deposition techniques known in the art, such as thermal deposition, chemical vapor deposition, electroplating, spray deposition, sputter coating, e-beam evaporation, ion beam evaporation or spray pyrolysis. In one embodiment, electroless plating or electroplating is used to apply the intermediate porous metal layer.

Selective Plating

In one embodiment, the present invention can further include selectively surface activating a support proximate to a defect and preferentially depositing a material on the selectively surface activated portion of the support. For example, the porous substrate or the polished substrate can be selectively plated with a hydrogen-selective metal (or an alloy thereof) following application of the intermediate porous metal layer. In one embodiment, applying a dense hydrogen-selective membrane over the intermediate porous metal layer can include selectively plating the support with a hydrogen-selective metal or an alloy thereof.

Methods for fabricating gas separation modules that include selectively surface activating a support proximate to a defect and preferentially depositing a material on the selectively surface activated portion of the support are discussed in U.S. Provisional Patent Application No. 60/456,931, entitled "Method of Producing Thin Palladium and Palladium Alloy Layers," by Ma, et al., filed on Mar. 21, 2003, and in "Method for Curing Defects in the Fabrication of a Composite Gas Separation Module," by Ma, et al., each incorporated by reference herein in their entirety.

Abrasion of a Deposited Material

In one embodiment, the present invention includes the further step of abrading a deposited material. For example, the intermediate porous metal layer can be abraded prior to applying the dense gas-selective membrane. In another embodiment, a material, such as a gas-selective material, is applied over the intermediate porous metal layer prior to applying the dense gas-selective membrane, and the product can then be abraded prior to applying the dense gas-selective membrane. In another embodiment, a first component of the dense gas-selective membrane can be applied over the intermediate porous metal layer, the deposited first component can be abraded, and a second component of the dense gas-selective membrane can be applied over the abraded, deposited first component.

Abrasion of a deposited material can help to reduce or prevent the repetition of intermediate porous metal layer's porous morphology in subsequent applications of materials, e.g., gas-selective materials such as hydrogen-selective metal or an alloy thereof. In one embodiment, the intermediate porous metal layer is formed over the porous substrate; the intermediate porous metal layer is abraded, thereby forming a polished intermediate porous metal layer; and a gas-selective material is deposited on the polished intermediate porous metal layer.

Methods for fabricating composite gas separation modules that include abrading a deposited material are further discussed in U.S. Provisional Patent Application No. 60/456,930, entitled "Method for Producing Dense Selective Layers," by Ma, et al., filed on Mar. 21, 2003, and in "Method for Fabricating Composite Gas Separation Modules," by Ma, et al., each incorporated by reference herein in their entirety.

Reacting Chloride to Form Phosphate

A surface activated support, the intermediate porous metal layer, the dense gas-selective membrane, or other intermediate products described herein can contain chloride anions. Residual metal chlorides, resulting from surface activation or electroless plating steps, can remain in the pores of the support. In one embodiment, the invention includes removing residual metal chlorides, for example, by treatment with an aqueous phosphoric acid solution, e.g., 10% phosphoric acid solution. For example, the treatment can include application of 10% phosphoric acid solution at room temperature for a time sufficient to convert residual metal chlorides to metal phosphates, e.g., about 30 minutes, followed by appropriate rinsing and drying, e.g., rinsing with deionized water for about 30 minutes and drying at about 120° C. for at least about 2 hours.

Therefore, the present method for forming a composite gas separation module can further comprise the step of reacting chloride anions to form metal phosphates. For example, residual metal chlorides can be removed between depositions of dense gas-selective membrane components. Treatment with an aqueous phosphoric acid solution can promote exchange of chloride anions to form insoluble metal phosphates. The removal of metal chlorides from the pores can reduce or substantially eliminate corrosion of the support during subsequent plating steps and post-synthesis. In addition, the formed metal phosphates can be more stable than metal chlorides in a dense hydrogen-selective membrane at high temperatures. This method can retard the formation of metal chlorides in the support as well as retard the formation of metal chlorides used in electroless plating solutions and activation compositions.

Composite gas separation modules and methods for their fabrication suitable for use in conjunction with the present invention are described in U.S. Pat. No. 6,152,987, cited supra, and also in U.S. Provisional Patent Application No. 60/456,931, cited supra; U.S. Provisional Patent Application No. 60/457,061, entitled "Method of Making Intermetallic Diffusion Baffler," by Ma, et al., filed on Mar. 21, 2003; U.S. Provisional Patent Application No. 60/456,930, cited supra; U.S. Provisional Patent Application No. 60/467,493, entitled "High Melting Point Metal Diffusion Bafflers for Composite Palladium Porous Stainless Steel Membranes," by Ma, et al., filed on May 2, 2003; U.S. Patent Application No. 10/804,848, entitled "Method for Curing Defects in the Fabrication of a Composite Gas Separation Module," by Ma, et al., cited supra; and U.S. Patent Application No. 10/804,847, entitled "Method for Fabricating Composite Gas Separation Modules," by Ma, et al., cited supra, each of which is incorporated herein by reference in its entirety.

EXEMPLIFICATION

The invention will now be further and specifically described by the following examples which are not intended to be limiting.

Example 1

This example describes the fabrication of a composite structure comprising palladium, an intermediate porous metal layer (e.g., a porous metal layer intermetallic diffusion barrier), and a 0.1 micron grade porous 316L stainless steel ("PSS") support.

A 6 inch long, 1 inch O.D., section of PSS tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The tube was oxidized in static air at 400° C. for 12 hours wherein the rates of heating and cooling were 3° C. per minute. The oxidized tube was then surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above-described surface activation cycle was performed a total of five times followed by drying for 2 hours at 120° C.

An intermediate porous metal layer of palladium and silver was then applied to the surface activated tube. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4Cl_2H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. The plating solution was composed of 0.519 grams $AgNO_3$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Each metallic layer was applied by contacting the tube with a plating solution for 90 minutes and was followed by rinsing the tube with deionized water, but not with intermediate activation, drying or sintering. The specific layers, an estimate of the layer thicknesses, and the order of their application were Pd (about 1.5 microns), Ag (about 0.3 microns), Pd (about 1 micron), Ag (about 0.3 microns), and Pd (about 1.5 microns) (a total of five layers). (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.) After applying the above-described palladium and silver layers, the membrane was dried at 120° C. for about 48 hours. Helium flux was measured across the membrane thus formed. These measurements indicated that the membrane was not gas tight at this point.

The membrane surface was then lightly brushed with a fine artist's paint brush. Following this brushing, the entire plated surface of the tube was dipped in 0.1M HCL for 60 seconds at room temperature. The membrane was then rinsed with deionized water at room temperature. Then, the membrane was surface activated by repeating the surface activation cycle, described supra, three times. The membrane was then dried at 120° C. overnight.

Palladium was then deposited on the exterior of the tube by electroless plating according to the above-described procedure three times for 90 minutes each time (a total of 4.5 hours). Between each of the 90 minute platings, the membrane was rinsed with deionized water (at 60° C.) not less than three times. After the last plating and rinsing with DI water, the membrane was dried for 2 hours at 120° C.

Defects (e.g., pores) present in the tube were then selectively surface activated from the inside of the tube. Aqueous solutions of $SnCl_2$ (1 g/L) and $PdCl_2$ (0.1 g/L) were sequentially supplied to the inside surface of the tube. The inside of the tube was filled with the $SnCl_2$ solution at 20° C. for about 5 minutes followed by subsequent rinsing with deionized water. The tube was then filled with the $PdCl_2$ solution at 20° C. for about 5 minutes followed by rinsing first with 0.01 molar hydrochloric acid and then with deionized water. This selective surface activation cycle was performed a total of five times followed by drying for 2 hours at 120° C.

The tube was then plated with three layers of palladium from the outside of the tube using the palladium plating procedure described supra. Following this further palladium plating, the inside of the tube was treated with a 10% phosphoric acid solution for about 30 minutes and then rinsed with deionized water and thoroughly dried at 120° C. The processes of selectively surface activating the tube from the inside, plating with palladium from the outside of the tube, and treating with phosphoric acid solution were repeated once.

The membrane was then lightly dry sanded with 2400 grit waterproof sand paper (SILICON CARBIDE, Struers, Inc., Westlake, Ohio). Following this, it was rinsed in acetone with a mild ultrasonic treatment for 15 minutes and then dried overnight at 120° C.

The membrane was then surface activated, as described above, by repeating the general surface activation cycle on the exterior of the tube three times. Palladium was then deposited on the exterior of the tube by electroless plating according to the above-described procedure four times for 90 minutes each time (a total of six hours). Between each of the 90 minute platings, the membrane was rinsed with deionized water (at 60° C.) not less than three times and the plating solution was replaced with a fresh plating solution. Following the final palladium plating, the membrane was rinsed with deionized water and thoroughly dried at 120° C.

Based on gravimetric data, the total palladium and silver thickness of the finished membrane was 24 microns.

The membrane was tested for hydrogen permeation at 500° C. with a 1 atmosphere pressure differential for a cumulative total of 608 hours. During the first 501 hours of continuous testing, the hydrogen permeance measured under these conditions rose from 15.7 to 17.6 normal cubic meters per square meter per hour (reference temperature=0° C., reference pressure=1 atmosphere) ($Nm^3/m^2$-hr) at 24 hours and 501 hours, respectively. The separation factor at the end of the first 501 hour continuous test was estimated to be about 180 based on a helium leak measurement taken at 500° C. at 501 hours. During a second round of testing, no decline in the hydrogen permeance was observed for an additional 107 hours of testing. The membrane was observed to obey Sievert's law at 373, 449, and 498° C. for flux measurements taken with a pressure difference between 0.25 and 2.7 atmospheres. Thus, under these conditions, hydrogen permeation was limited by the diffusion of hydrogen atoms through the palladium. The activation energy obtained from hydrogen permeance measurements taken with a 1 atmosphere pressure difference over the temperature range of 366° C. to 500° C. was 10.9 kJ/mol.

Example 2

This example describes the fabrication of a composite structure comprising palladium, an intermediate porous metal layer (e.g., a porous metal layer intermetallic diffusion barrier), and a 0.1 micron grade porous 316L stainless steel ("PSS") support. A hydrogen selective membrane was formed on a 40 inch long section of 1 inch O.D. PSS using procedures substantially the same as those described in Example 1.

The total palladium and silver thickness of the finished membrane (the total noble metal thickness) was 25.5 microns, determined gravimetrically. The membrane was tested for hydrogen permeation at 450° C. and 500° C. with a 1 atmosphere pressure differential. This membrane had hydrogen permeance of 5.05 $Nm^3/m^2$-hr at 450° C. and 5.67 $Nm^3/m^2$-hr at 500° C. Based on these two permeance measurements, the activation energy was estimated to be about 10.8 kJ/mol.

Example 3

This example describes an experiment showing the stability of an intermediate porous metal layer.

An intermediate porous metal layer of palladium and silver was deposited on a porous 316L stainless steel ("PSS") support. The support was a 6 inch long, 1 inch O.D. section of 0.1 micron grade PSS tube, welded to sections of 1 inch O.D. dense 316L stainless steel tube on each end, obtained from Mott Metallurgical Corporation.

Contaminants were removed by cleaning the tube in an ultrasonic bath with alkaline solution at 60° C. for one half hour. The tube was then sequentially rinsed using tap water, deionized water and isopropanol.

The tube was oxidized in air at 400° C. for 10 hours wherein the rates of heating and cooling were 3° C. per minute. The oxidized tube was then surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above described surface activation cycle was performed a total of five times followed by drying for 2 hours at 120° C.

An intermediate porous metal layer of palladium and silver was then applied to the surface activated tube. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4$ $Cl_2H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. The plating solution was composed of 0.519 grams $AgNO_3$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

The intermediate porous metal layer of palladium and silver was formed with 17 layers of silver and 20 layers of palladium in three plating cycles. Each layer of palladium or silver was applied by contacting the tube with a plating solution for 90 minutes and was followed by rinsing the tube with deionized water, but not with intermediate activation, drying or sintering within one cycle. Between cycles, the membrane was dried and the surface activation cycle was performed three times.

Five layers of silver and six layers of palladium were deposited in the first plating cycle. The layer order of first plating cycle was Pd—Ag—Pd—Ag—Pd—Ag—Pd—Ag—Pd—Ag—Pd. In each of the second and third plating cycles six layers of silver and seven layers of palladium were deposited. The second and third plating cycles each had the following layer order: Pd—Ag—Pd—Ag—Pd—Ag—Pd—Ag—Pd—Ag—Pd—Ag—Pd.

The approximate layer thickness for each Pd layer was about 0.32 microns and for each Ag layer was about 0.26 microns. (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.)

Determined gravimetrically and not accounting for porosity, the total thickness of the palladium and silver layers was about 10.8 microns. Following deposition of the palladium and silver layers, the membrane was porous as determined by helium flux measurements.

The tube was then plated with an additional 21.1 microns of palladium in two cycles over the intermediate porous metal layer of palladium and silver. The tube was plated using the palladium plating procedures described above.

The membrane was then surface activated, as described above, by repeating the surface activation cycle on the exterior of the tube three times. Palladium was then deposited on the exterior of the tube by electroless plating according to the above-described procedure five times for 90 minutes each time (a total of about 7.5 hours). Between each of the 90 minute palladium platings, the membrane was rinsed with deionized water (at 60° C.) not less than three times and the plating solution was replaced with a fresh plating solution. The membrane was thoroughly dried following application of the five plating solutions. Then, this procedure of surface activation, 7.5 hours of palladium plating, rinsing and drying was repeated once.

The resulting tube was then heated to 500° C. and held at that temperature for 100 hours under flowing helium. At the end of this heat treatment, the membrane remained porous to helium which indicated that the intermediate porous metal layers formed by the methods of the present invention are stable at operational temperatures for hydrogen separation or membrane reactor applications.

Example 4

This example describes the fabrication of a composite structure that includes palladium, an intermediate porous metal layer, and a 0.1 micron grade porous HASTELLOY® C-22® support. (HASTELLOY® C-22® is a nickel-chromium-molybdenum-iron-tungsten alloy.)

A 31.3 inch long, 1 inch O.D., section of porous HASTELLOY® C-22® tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The tube was oxidized in static air at 600° C. for 12 hours. The rate of heating and cooling was 3° C. per minute. Following oxidation, helium flux through the support was measured to be 16.0 $Nm^3/m^2$-hr at a pressure difference of 1 atm and a temperature of 20° C. Subsequent helium flux measurements were made under the same conditions.

The oxidized tube was then surface activated by sequentially immersing the tube in baths of $SnCl_2$ and $PdCl_2$. The tube was immersed in 3.5 L of aqueous $SnCl_2$ (1 g/L) at 20° C. for about 5 minutes and was subsequently rinsed with deionized water. The tube was then immersed in 3.5 L of aqueous $PdCl_2$ (0.1 g/L) at 20° C. for about 5 minutes followed by rinsing first with 0.01 molar hydrochloric acid and then with deionized water. The above-described surface activation cycle was performed a total of six times followed by drying overnight at 120° C.

An intermediate porous metal layer of palladium and silver was then applied to the surface activated tube. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4Cl_2H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. The plating solution was composed of 0.519 grams $AgNO_3$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Each metallic layer was applied by contacting the tube with a plating solution for 90 minutes and was followed by rinsing the tube with deionized water, but not with intermediate activation, drying or sintering. The specific layers, an estimate of the layer thicknesses, and the order of their application were Pd (about 1.5 microns), Ag (about 0.3 microns), Pd (about 1 micron), Ag (about 0.3 microns), and Pd (about 1.5 microns). (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.)

After applying the above-described palladium/silver layers, the membrane was dried at 120° C. for about 48 hours. The membrane was then lightly brushed with a fine artist's paint brush. Following this, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. The membrane was then plated with another consecutive sequence of Pd/Ag/Pd/Ag/Pd layers, as described above. The membrane was subsequently dried at 120° C. overnight.

The dried membrane was then lightly brushed with a fine artist's paint brush. After this brushing, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. The membrane was then plated with palladium for another 450 minutes. During this palladium plating, the plating solution was changed every 90 minutes. The membrane was rinsed each time the solution was changed with deionized water at 60° C. The membrane was not surface activated between these solution changes. The resulting membrane was dried at 120° C. overnight. The membrane had a total plated thickness of 14.23 microns and a high helium flux of 12.2 $Nm^3/m^2$-hr, indicating that the deposited layers were porous.

The surface of the deposited membrane was then abraded by hand using 600 grit dry sandpaper (TUFBAK GOLD T481; Norton Abrasives, Worcester, Mass.). Following abrasion, the membrane was cleaned in an ultrasonic bath of isopropyl alcohol. The membrane was then dried at room temperature under flowing helium. This polishing treatment reduced the total thickness of the membrane to 13.93 microns (determined gravimetrically). The helium flux of the membrane decreased to 10.9 $Nm^3/m^2$-hr.

The membrane was finished by performing 4 palladium plating cycles, each 450 minutes in duration. For each cycle the following steps were performed. First, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. Next, the membrane was plated with palladium for 450 minutes. During this palladium plating, the plating solution was changed every 90 minutes. The membrane was rinsed each time the solution was changed with deionized water at 60° C. The membrane was not surface activated between these plating solution changes. The resulting membrane was dried at 120° C. overnight.

Based on gravimetric data, the total palladium and silver thickness of the finished membrane was 33 microns. The membrane had a helium flux of 0.0012 $Nm^3/m^2$-hr. The hydrogen permeance of the membrane reached a stable value of 14 $Nm^3/m^2$-hr over a four day test at 500° C.

While this invention has been particularly shown and described with references to preferred embodiments thereof, it will be understood by those skilled in the art that various changes in form and details may be made therein without departing from the scope of the invention encompassed by the appended claims.

We claim:

1. A composite gas separation module, comprising:
   a) a porous metal substrate;
   b) an intermediate porous metal layer, wherein the intermediate porous metal layer overlies the porous metal substrate; and c) a dense hydrogen-selective membrane, wherein the dense hydrogen-selective membrane overlies the intermediate porous metal layer.

2. The composite gas separation module of claim 1 wherein the porous metal substrate is stainless steel.

3. The composite gas separation module of claim 1 wherein the porous metal substrate is an alloy containing chromium and nickel.

4. The composite gas separation module of claim 3 wherein the alloy further contains molybdenum.

5. The composite gas separation module of claim 1 wherein the intermediate porous metal layer includes palladium.

6. The composite gas separation module of claim 5 wherein the intermediate porous metal layer includes palladium and a Group IB metal.

7. The composite gas separation module of claim 6 wherein the Group IB metal is silver or copper.

8. The composite gas separation module of claim 6 wherein the intermediate porous metal layer includes alternating layers of palladium and the Group IB metal.

9. The composite gas separation module of claim 1 wherein the intermediate porous metal layer is at least about 5 microns thick.

10. The composite gas separation module of claim 1 wherein the intermediate porous metal layer is about 1 to about 10 microns thick.

11. The composite gas separation module of claim 1 wherein the mean pore size of the intermediate porous metal layer is less than the mean pore size of the porous metal substrate.

12. The composite gas separation module of claim 1 wherein the intermediate porous metal layer has a top side and a bottom side and wherein the intermediate porous metal layer is directly adjacent to the porous metal substrate on the bottom side and is directly adjacent to the dense hydrogen-selective membrane on the top side.

13. The composite gas separation module of claim 1 wherein the dense hydrogen-selective membrane includes palladium or an alloy thereof.

14. The composite gas separation module of claim 1 further comprising a layer of a ceramic bonded to the porous metal substrate and underlying the intermediate porous metal layer.

15. A method for fabricating a composite gas separation module, comprising the steps of:
 a) applying an intermediate porous metal layer over a porous metal substrate; and
 b) applying a dense hydrogen-selective membrane over the intermediate porous metal layer, thereby forming the composite gas separation module.

16. The method of claim 15 further comprising the step of oxidizing the surface of the porous metal substrate prior to applying the intermediate porous metal layer.

17. The method of claim 15 further comprising the step of surface activating the porous metal substrate prior to applying the intermediate porous metal layer.

18. The method of claim 17 wherein surface activating the porous metal substrate includes seeding the porous metal substrate with nuclei of a hydrogen-selective metal.

19. The method of claim 15 wherein the intermediate porous metal layer is applied by electroless plating.

20. The method of claim 15 wherein the intermediate porous metal layer includes palladium and a Group IB metal.

21. The method of claim 20 wherein the Group IB metal is silver or copper.

22. The method of claim 20 wherein the intermediate porous metal layer is applied by depositing alternating layers of palladium and the Group IB metal over the porous metal substrate.

23. The method of claim 15 further comprising the step of abrading the surface of the intermediate porous metal layer, thereby forming a polished substrate, prior to application of the dense hydrogen-selective membrane over the intermediate porous metal layer.

24. The method of claim 15 further comprising the step of depositing a hydrogen-selective metal on the intermediate porous metal layer, thereby forming a coated substrate and abrading the surface of the coated substrate, thereby forming an polished substrate, prior to application of the dense hydrogen-selective membrane over the intermediate porous metal layer.

25. The method of claim 15 wherein applying the dense hydrogen-selective membrane includes depositing palladium, or an alloy thereof, over the intermediate porous metal layer.

26. The method of claim 25 wherein the dense hydrogen-selective membrane includes palladium alloyed with at least one of the metals selected from the group consisting of copper, silver, gold, platinum, ruthenium, rhodium, yttrium, cerium and indium.

27. The method of claim 15 wherein applying the dense hydrogen-selective membrane includes depositing a hydrogen-selective metal by a method selected from the group consisting of electroless plating, electroplating, thermal deposition, chemical vapor deposition, spray deposition, sputter coating, e-beam evaporation, ion beam evaporation and spray pyrolysis.

28. A composite gas separation module fabricated by the method of claim 15.

29. A method for selectively separating hydrogen gas from a hydrogen gas-containing gaseous stream, comprising the step of:
 directing the hydrogen gas-containing gaseous stream to a composite gas separation module, wherein the composite gas separation module includes:
 a) a porous metal substrate;
 b) an intermediate porous metal layer, wherein the intermediate porous metal layer overlies the porous metal substrate; and
 c) a dense hydrogen-selective membrane, wherein the dense hydrogen-selective membrane overlies the intermediate porous metal layer;
 whereby hydrogen gas is at least partially partitioned from the gaseous stream by passing through the dense hydrogen-selective membrane.

30. The method of claim 29 further comprising the step of reacting hydrogen gas-producing reactants to produce the gaseous stream.

31. The method of claim 29 wherein a layer of a ceramic is bonded to the porous metal substrate and underlies the intermediate porous metal layer.

32. The method of claim 29 wherein the intermediate porous metal layer includes alternating layers of palladium and a Group IB metal.

33. The method of claim 32 wherein the Group IB metal is silver or copper.

34. The method of claim 29 wherein the intermediate porous metal layer is about 4 to about 8 microns thick.

35. The method of claim 29 wherein the dense hydrogen-selective membrane includes palladium or an alloy thereof.

36. A hydrogen gas separator, comprising:
a first porous layer made from a hydrogen permeable material;
a porous base layer supporting the first porous layer; and
a solid layer of a hydrogen permeable material disposed on said first porous layer and in contact with said first porous layer.

37. The separator according to claim 36 wherein said hydrogen permeable material of said first porous layer and said hydrogen permeable material of said solid layer are the same material.

38. The separator according to claim 36 wherein said porous base layer is not comprised of hydrogen permeable material that is selectively permeable to hydrogen gas.

39. The separator according to claim 38 further including at least one bonding layer disposed between said porous base layer and said first porous layer.

40. The separator according to claim 36 wherein said solid layer of said hydrogen permeable material is a deposition layer that is deposited onto said first porous layer.

41. The separator according to claim 36 wherein said porous base layer is shaped as a tube that defines a central conduit, wherein said first porous layer surrounds said base layer, and said solid layer surrounds said first porous layer.

42. A method of purifying hydrogen gas, comprising the steps of:
providing a hydrogen permeable structure having a porous layer of hydrogen permeable material, the porous layer being in contact with a dense hydrogen-selective membrane of the hydrogen permeable structure and supported by a porous base layer of material;
exposing said hydrogen permeable structure to a gas containing hydrogen gas; and
causing a pressure differential across the hydrogen permeable structure,
wherein said hydrogen gas permeates through said hydrogen permeable structure and is collected.

43. The method according to claim 42 wherein said hydrogen permeable structure is tubular and said step of exposing said hydrogen permeable structure includes passing gas though said hydrogen permeable structure under pressure.

44. The method according to claim 42 wherein said hydrogen permeable material of said porous layer and said hydrogen permeable material of said dense hydrogen-selective membrane are the same material.

45. A method of manufacturing a hydrogen gas separator, comprising the steps of:
forming a porous base layer;
forming a first porous layer from a hydrogen permeable material on the porous base layer; and
depositing a dense hydrogen-selective membrane of a hydrogen permeable material in contact with said porous layer.

46. The method according to claim 45 further including the step of bonding said first porous layer to said porous base layer.

47. A hydrogen gas separator, comprising:
a first porous layer made from a first hydrogen permeable material;
a porous base layer supporting the first porous base layer; and
a dense hydrogen-selective membrane of a second hydrogen permeable material disposed on said first porous layer and in contact with said first porous layer.

48. The hydrogen gas separator of claim 47 wherein the first hydrogen permeable material and the second hydrogen permeable material are the same material.

* * * * *